O. T. WAITE.
GRASS RUG.
APPLICATION FILED NOV. 19, 1915.

1,177,555. Patented Mar. 28, 1916.

Witnesses:
Harry S. Gaither

Inventor:
Ossian T. Waite
by Banning & Banning
Attys

UNITED STATES PATENT OFFICE.

OSSIAN T. WAITE, OF OSHKOSH, WISCONSIN, ASSIGNOR TO WAITE GRASS CARPET COMPANY, OF OSHKOSH, WISCONSIN, A CORPORATION OF WISCONSIN.

GRASS RUG.

1,177,555.  Specification of Letters Patent.  Patented Mar. 28, 1916.

Application filed November 19, 1915. Serial No. 62,394.

*To all whom it may concern:*

Be it known that I, OSSIAN T. WAITE, a citizen of the United States, residing at Oshkosh, in the county of Winnebago and State of Wisconsin, have invented certain new and useful Improvements in Grass Rugs, of which the following is a specification.

This invention pertains to a grass rug so woven as to introduce an ornamental design or pattern into the fabric of the rug without materially increasing the expense of weaving, and in such a manner as to materially increase the strength and durability of the rug, and greatly improve its appearance. Heretofore, grass rugs, of the kind now being woven from grass twine formed of marsh wire grass, have either been undecorated or decorated only with stencil patterns. Rugs of this character have enjoyed great popularity in trade, but by reason of their somewhat rustic appearance, have been used principally for porch coverings and the like, although well suited for other purposes.

The rug of the present invention is designed to afford a more elegant and durable appearance than has heretofore been secured, and thus better adapt the rug for interior use, and this without a sacrifice of those characteristics which distinguish grass rugs from those woven from other materials.

Figure 1:
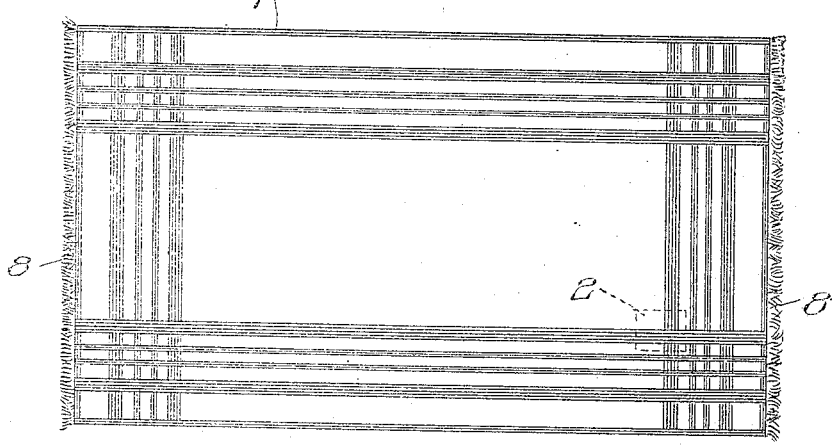
Figure 2:
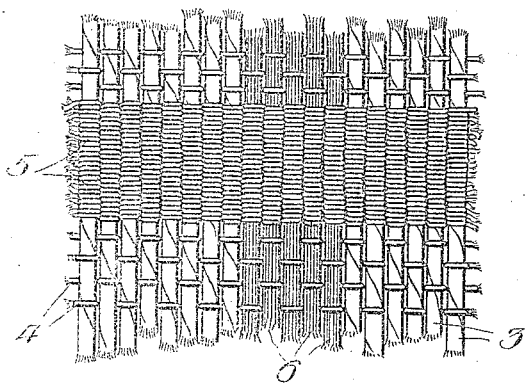

In the drawings: Figure 1 is a plan view of the grass rug, showing a border design woven in accordance with the present invention; and Fig. 2 is an enlarged detail of the dotted square designated 2 in Fig. 1.

As is customary in the weaving of grass rugs, the rug of the present invention is composed of woof strands 3 of grass twine of the kind universally employed at the present time in the weaving of grass rugs. These strands of grass twine are relatively thick or bulky, and are composed of the so-called wire grass or sedge, which grows wild in certain districts of the Northern States and elsewhere. This thick grass twine serves to give bulk or body to the rug, and is usually of a dull greenish color, which affords the base tone in the completed rug. The color is a neutral one which well adapts the rug for use on porches and elsewhere, and heretofore this base tone has sometimes been slightly varied by employing cotton warp threads of varying shades, such as red, blue, etc., but without any effort to introduce a border or other design into the completed fabric.

In the present invention, the warp threads 4 of the body of the rug of cotton yarn or the like are woven in and out through the grass woof strands in the usual manner; that is, in widely spaced relation to one another, which weaving exhibits the grass woof through the warp, which latter, if distinctly colored, serves only to slightly vary the tone of the rug without introducing any distinctive appearance in the rug.

In the present invention, the design is formed by laying the warp threads 5 of cotton yarn or the like in close relation to one another so as to entirely or substantially conceal the grass woof, with the result that a stripe or design of distinctive color and appearance will be introduced without materially altering the character of the weaving operation, since the warp threads in the pattern, like the remaining warp threads, will simply be passed over and under the woof strands, but in such relation as to dominate the color scheme.

Where a border is employed, around all sides of the rug, it is desirable to introduce a plurality of distinctively colored woof strands 6 into the fabric, which, of course, run counter to the pattern warp strands and serve to carry the pattern across the rug. The rug may be completed by running a selvage 7 composed of a plurality of closely spaced warp strands harmonizing with the pattern or design, and, if desired, the ends of the warp threads may be woven into a fringe 8 at each end of the rug.

The pattern shown in Fig. 1 consists of four parallel stripes running around the border of the rug, the side stripes being formed by the contiguous strands of the warp, and the end stripes by the use of distinctive woof strands, which are preferably formed of bundles of the warp yarn, each bundle of a size to correspond with the bulky grass twine, and the pattern may obviously be woven in red, blue, yellow, or other distinctive color, or in combinations of the same. Although the simplest form of weaving, as shown, requires that the pattern run at right angles to the weaving, it is obvious that diagonal or similar patterns may be introduced by the employment of familiar methods of weaving, although, in the making of grass rugs, simple striped patterns of the kind shown are ordinarily the most satisfactory. In addition to improving the appearance of the rug, the method of weaving above described introduces elements of strength and durability into the completed rug, in that it reduces the grass surface exposed to wear and tends to break up this surface into smaller batches or areas with a corresponding increase in durability.

Rugs woven as above described present a neater and more elegant appearance than plain grass rugs or rugs decorated with stencil patterns, and in every way are improvements over the latter for many purposes.

I claim:

A patterned rug comprising a woof composed of relatively thick strands of grass twine and a warp composed of yarn, the warp threads composing the body of the rug being arranged in spaced relation to exhibit the grass woof, and the warp threads composing the pattern being arranged in contiguous relation to conceal the grass woof and exhibit stripes running counter to the woof, and woof strands of distinctive color composed of material other than grass and arranged to complete the warp pattern and running counter thereto, substantially as described.

OSSIAN T. WAITE.

Witnesses:
Geo. J. Meyer,
Reed O. Davis.